United States Patent [19]
Yamasita et al.

[11] 4,165,917
[45] Aug. 28, 1979

[54] OBJECTIVE FOR ENDOSCOPES

[75] Inventors: Nobuo Yamasita, Tama; Miwako Unami, Yokohama, both of Japan

[73] Assignee: Olympus Optical Co., Ltd., Tokyo, Japan

[21] Appl. No.: 784,427

[22] Filed: Apr. 4, 1977

[30] Foreign Application Priority Data

Apr. 5, 1976 [JP] Japan .................................. 51-37979

[51] Int. Cl.² .............................................. G02B 9/12
[52] U.S. Cl. ........................................ 350/225; 350/54
[58] Field of Search .................... 350/225, 54

[56] References Cited
U.S. PATENT DOCUMENTS

| | | | |
|---|---|---|---|
| 4,037,938 | 7/1977 | Yamashita | 350/225 |
| 4,042,295 | 8/1977 | Yamashita | 350/225 |

*Primary Examiner*—Conrad J. Clark
*Attorney, Agent, or Firm*—Cushman, Darby & Cushman

[57] ABSTRACT

An objective for endoscopes to be used in such endoscope arranged to transmit an image of an object by a plural number or relay lens groups and basically comprising a front diverging lens group, which comprises a negative lens, and a rear converging lens group, which comprises a positive lens and positive cemented doublet. The objective for endoscopes is arranged so that aberrations of the endoscope as a whole including the relay lens groups are corrected favorably.

9 Claims, 40 Drawing Figures

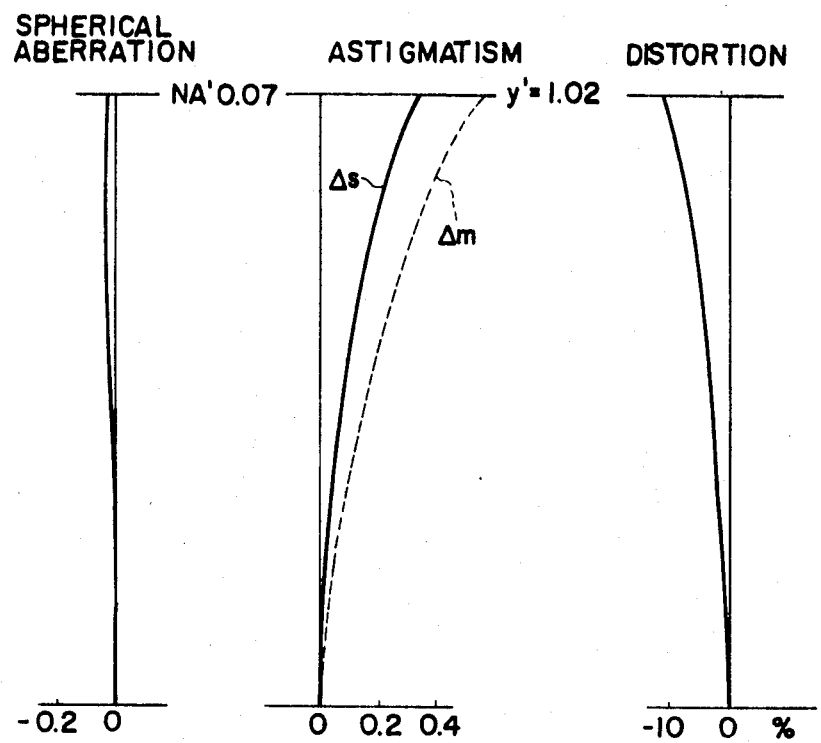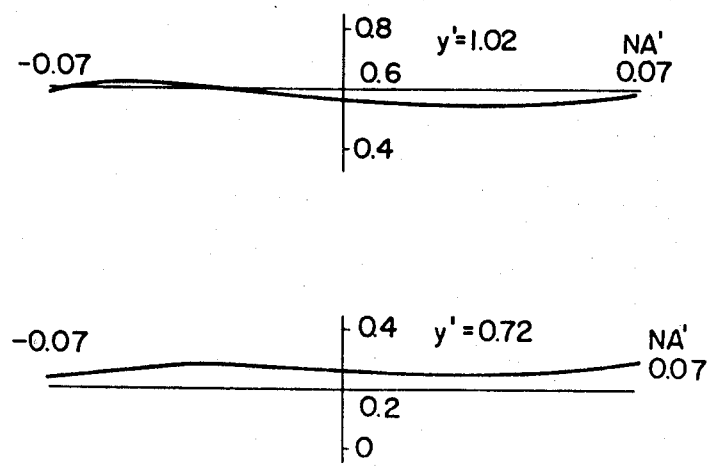

FIG. 9A
SPHERICAL ABERRATION
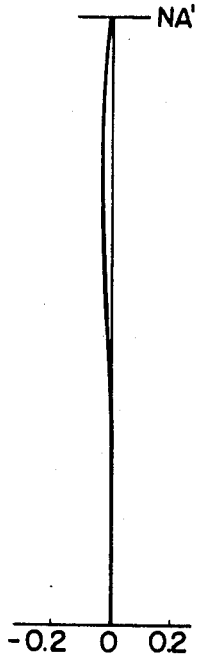
FIG. 9B
ASTIGMATISM
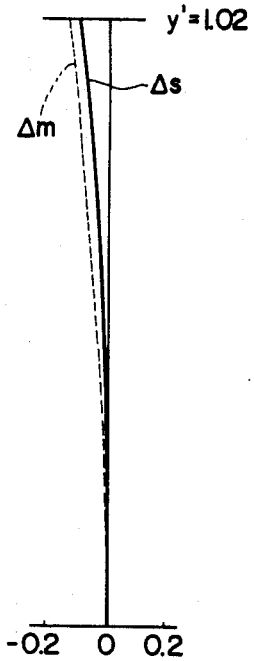
FIG. 9C
DISTORTION
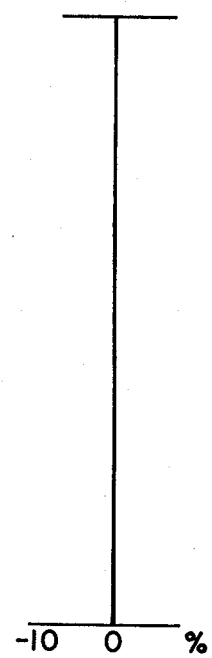
FIG. 9D
OFFAXIAL SPHERICAL ABERRATION (MERIDIONAL)
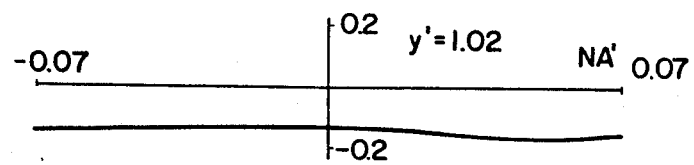
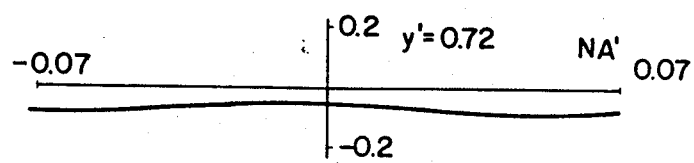

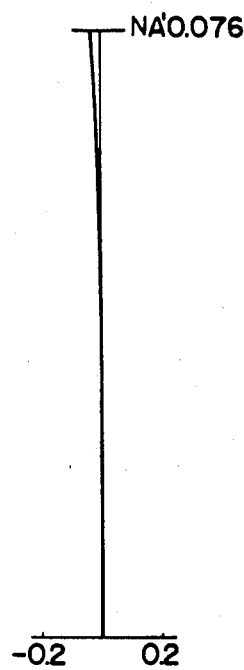
FIG. 10A
SPHERICAL ABERRATION
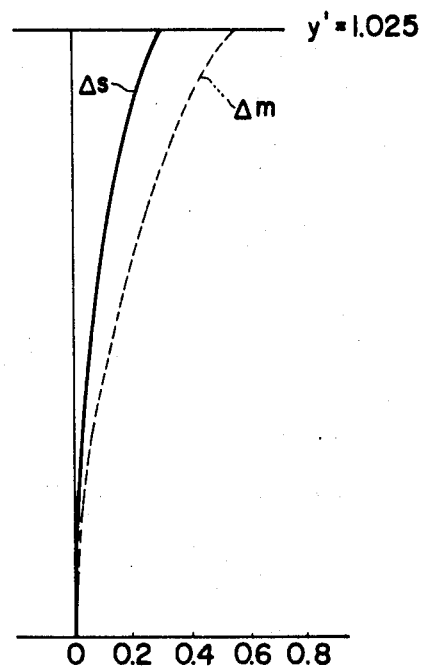
FIG. 10B
ASTIGMATISM
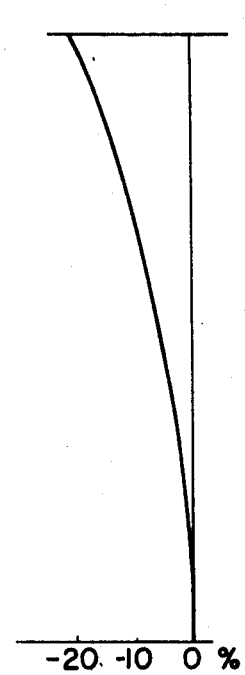
FIG. 10C
DISTORTION
FIG. 10D
OFFAXIAL SPHERICAL ABERRATION (MERIDIONAL)
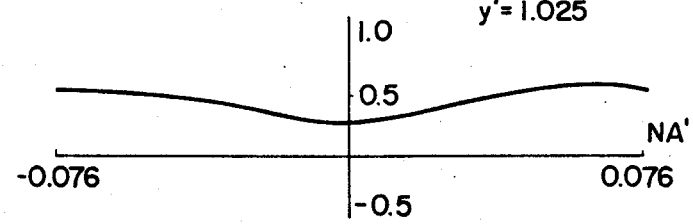
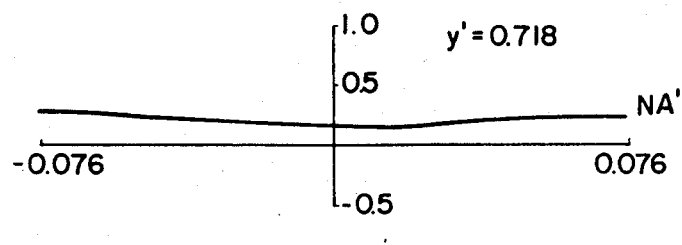

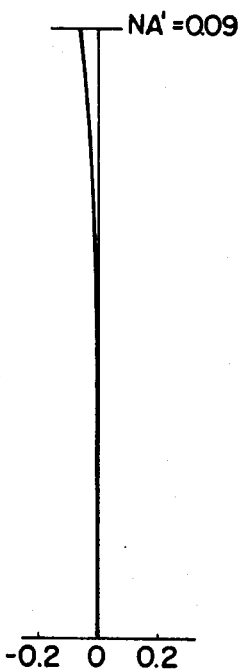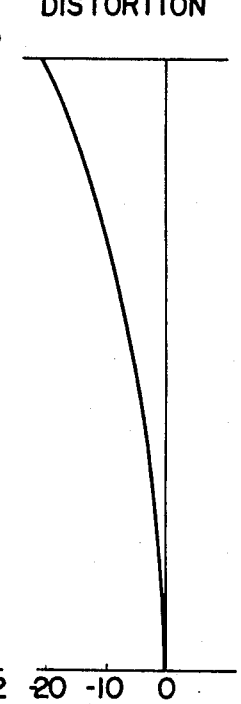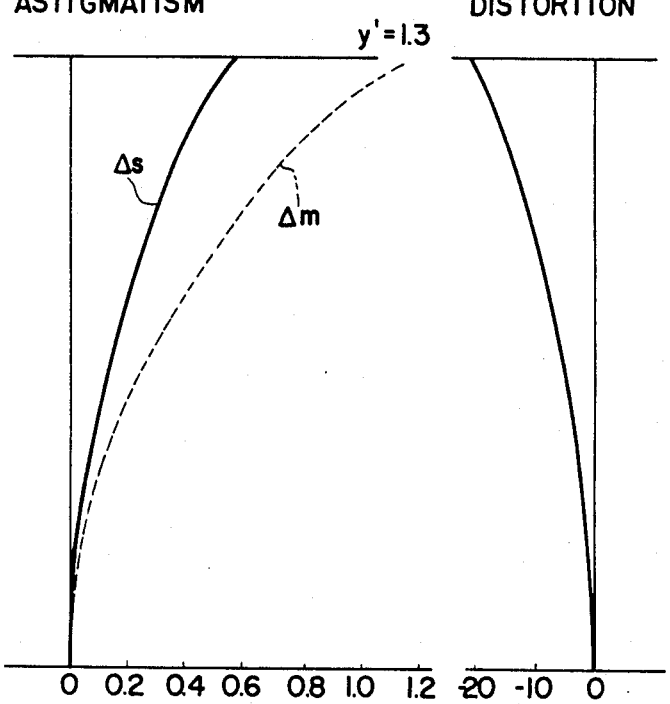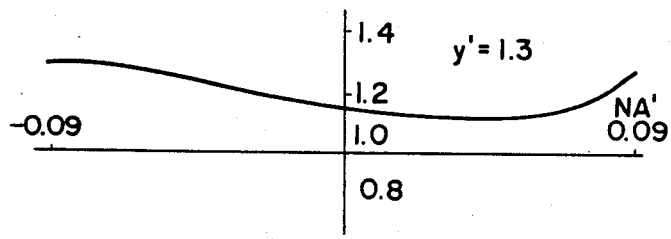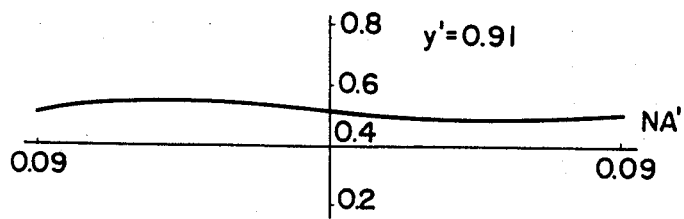

FIG. 12A SPHERICAL ABERRATION
FIG. 12B ASTIGMATISM
FIG. 12C DISTORTION
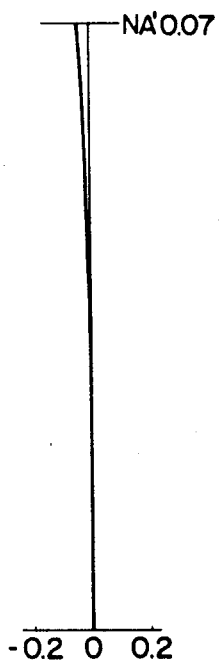
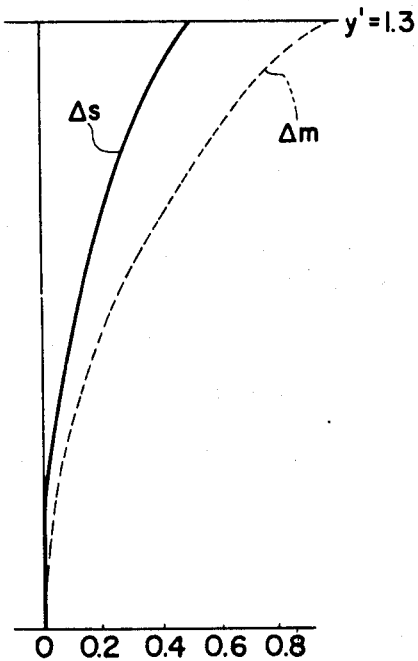
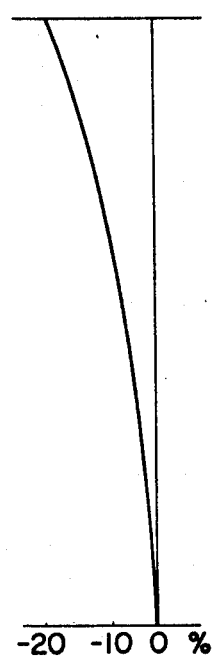
FIG. 12D
OFFAXIAL SPHERICAL ABERRATION (MERIDIONAL)
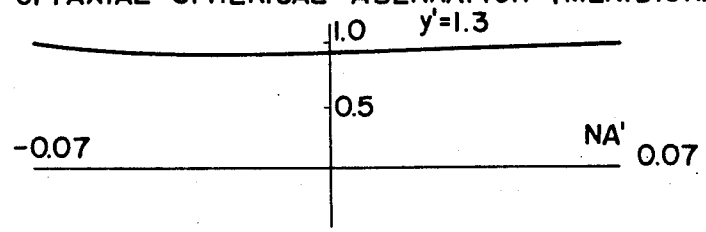

FIG. 13A  FIG. 13B  FIG. 13C
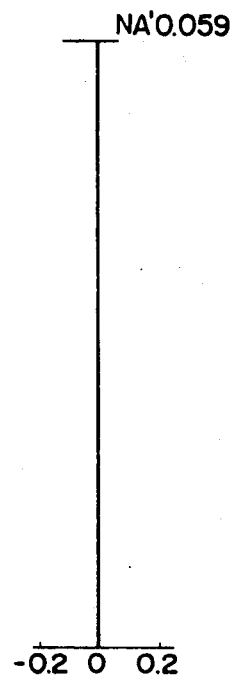
SPHERICAL ABERRATION
NA'0.059
-0.2  0  0.2
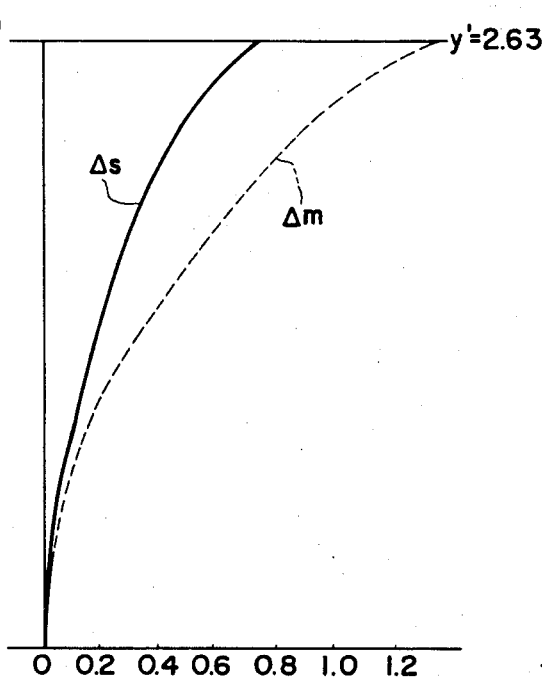
ASTIGMATISM
y'=2.63
Δs
Δm
0  0.2  0.4  0.6  0.8  1.0  1.2
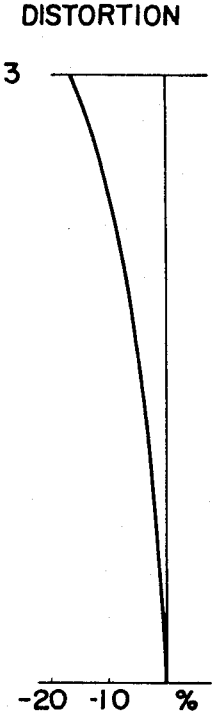
DISTORTION
-20  -10  %
FIG. 13D
OFFAXIAL SPHERICAL ABERRATION (MERIDIONAL)
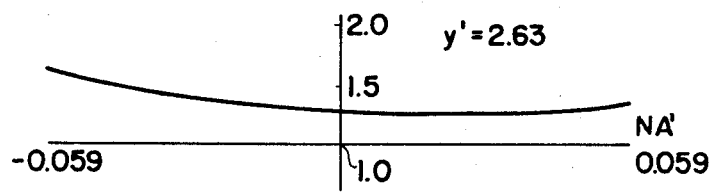
2.0  y'=2.63
1.5
NA'
-0.059  1.0  0.059
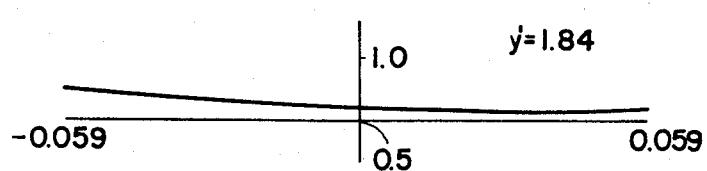
y'=1.84
1.0
-0.059  0.5  0.059

FIG. 14A SPHERICAL ABERRATION NA 0.063
FIG. 14B ASTIGMATISM
FIG. 14C DISTORTION
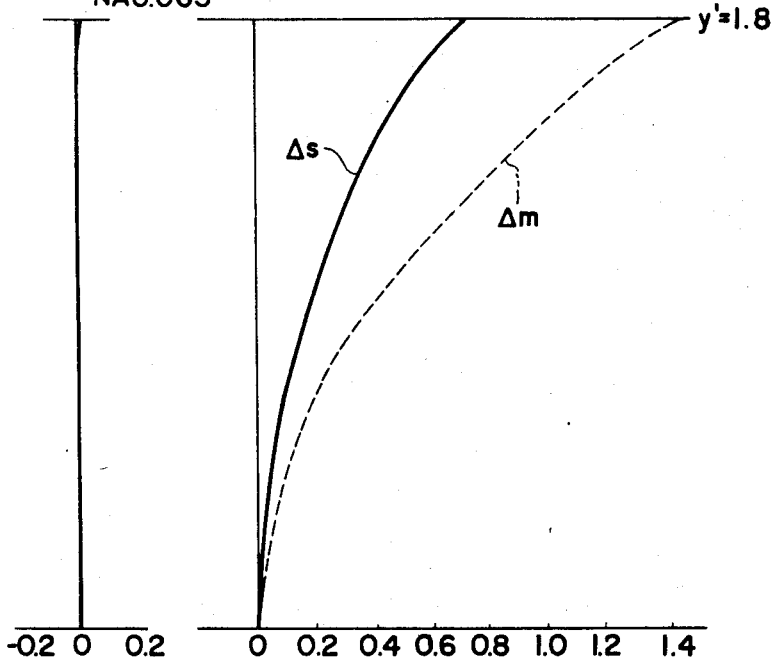
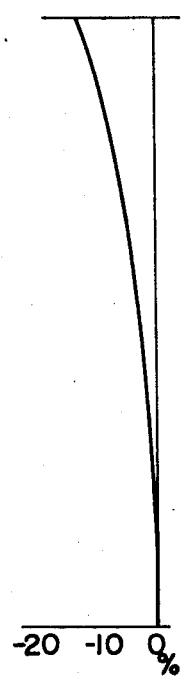
FIG. 14D
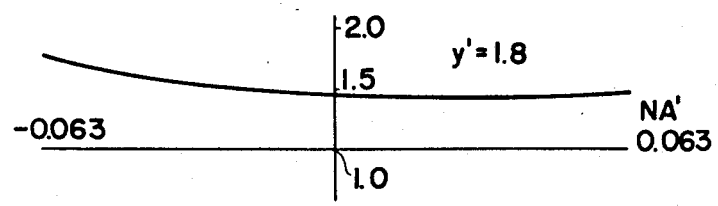
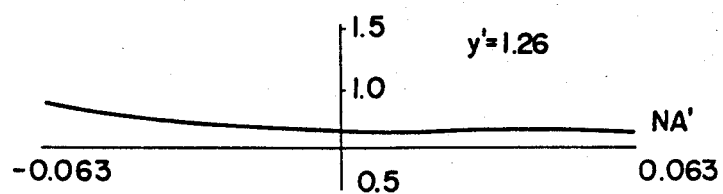
OFFAXIAL SPHERICAL ABERRATION (MERIDIONAL)

OBJECTIVE FOR ENDOSCOPES

BACKGROUND OF THE INVENTION

1. Field of the Invention

The present invention relates to an objective to be used in endoscopes in which an image of an object is transmitted in turn by a plural number of relay lens groups and, more particularly, to a retrofocus type objective comprising a front diverging lens group and rear converging lens group.

2. Description of the Prior Art

Most of the known objectives for endoscopes comprise a single lens or two or three lenses due to reasons that the distal end of an endoscope is small in diameter and that it is therefore difficult to manufacture the lenses. On the other hand, in endoscopes, the image is transmitted several times by means of relay lens groups and, therefore, it is necessary to arrange the relay lens groups so that their lens surfaces contacting air are minimized in order to reduce the loss of light caused by reflection on lens surfaces contacting air. So, it is unavoidable to arrange the relay lens group so that it has simple lens configuration and, consequently, sagittal astigmatism and meridional astigmatism of negative values are necessarily caused. Moreover, as a plural number of relay lens groups are used in an endoscope, the relay lens system as a whole causes a considerably large amount of astigmatism. Therefore, for the final image obtained by the endoscope, it is impossible to favourably focus the image in the central portion and image in the marginal portion at the same time even when aberrations of the objective are corrected favourably. Besides, in cases of side-viewing endoscopes and oblique-viewing endoscopes, a prism or prisms are arranged in front of the objective in order to refract the light. When, however, the field angle of the objective is large, the prism necessarily becomes considerably large and it becomes impossible to arrange such large prism in the distal end of the endoscope which has a small diameter. Moreover, when the prism becomes large, it is unavoidable to make the cover glass also large.

SUMMARY OF THE INVENTION

It is, therefore, a primary object of the present invention to provide a retrofocus type objective for endoscopes which comprises a front lens group arranged as a diverging lens group and a rear lens group arranged as a converging lens group and which is compact in size, has a wide field angle and is arranged so that aberrations of the endoscope as a whole including the relay lens groups are corrected favourably.

The basic lens configuration of the objective for endoscopes according to the present invention is as described below. That is, the objective comprises a front diverging lens group and rear converging lens group as described in the above. The front diverging lens group comprises a negative meniscus lens for which the surface on the object side is a flat or convex surface so that it is possible to use the negative meniscus lens also as a cover glass. The rear converging lens group comprises a positive lens and a positive cemented doublet. Generally, for retrofocus type objectives, spherical aberration and lateral chromatic aberration become unfavourable through it is possible to favourably correct curvature of field over a wide field. To correct spherical aberration and lateral chromatic aberration favourably, the objective according to the present invention is arranged as follows. That is, for the positive lens positioned on the object side in the rear converging lens group, it is so arranged that the absolute value of radius of curvature of its surface on the object side is larger than the absolute value of radius of curvature of its surface on the image side. By this positive lens and positive cemented doublet in the rear lens group, spherical aberration and lateral chromatic aberration are corrected favourably. Besides the above-mentioned lens configuration, the objective according to the present invention is arranged to satisfy the following conditions.

(1) $-0.7 \leq P_O/MP_R \leq -0.35$
(2) $-0.75 \leq f_I/f_O \leq -0.4$
(3) $0.6 \leq |r_a/f_O| \leq 1.2$ In the above conditions, reference symbol $P_O$ represents Petzval's sum related to the focal length of the objective, reference symbol $P_R$ represents Petzval's sum of one relay lens group, reference symbol M represents the number of relay lens groups constituting the relay lens system, reference symbol $f_I$ represents the focal length of the front diverging lens group, reference symbol $f_O$ represents the focal length of the objective, and reference symbol $r_a$ represents the radius of curvature of the cemented surface of the cemented doublet in the rear coverging lens group.

The objective according to the present invention is arranged so that it causes astigmatism of positive value which is aproximately equal to astigmatism of value caused by relay lens system as a whole for transmitting the image in the endoscope in which the objective is to be used and that the above-mentioned astigmatism of positive value and astigmatism of negative value offset each other in order to favourably correct astigmatism of the endoscope as a whole. To correct meridional astigmatism of negative value, which is caused by the relay lens system, by means of the objective, it is necessary to satisfy the following formula when reference symbol $(R_m)_O$ represents the radius of curvature of meridional image surface at the image height y for the objective, reference symbol $(R_m)_R$ represents the radius of curvature of meridional image surface at the image height y for one relay lens group, and reference symbol M represents the number of relay lens groups constituting the relay lens system.

$$1/(R_m)_O = -M/(R_m)_R \tag{1}$$

Besides, when reference symbol $(R_s)_O$ represents the radius of curvature of sagittal image surface for the objective, the relation between Petzval's sum $P_O$ of the objective and astigmatism of the objective is expressed by the following formula.

$$3/(R_s)_O - 1/(R_m)_O = 2P_O \tag{2}$$

In the same way, the relation between Petzval's sum $P_R$ of one relay lens group and astigmatism of one relay lens group is expressed by the following formula when reference symbol $(R_s)_R$ represents the radius of curvature of sagittal image plane for one relay lens group.

$$3/(R_s)_R - 1/(R_m)_R = 2P_R \tag{3}$$

When the number of relay lens groups constituting the relay lens system is represented by reference symbol M, the relation between Petzval's sum of the relay lens system as a whole and astigmatism of the relay lens system as a whole becomes as follows:

$$3M/(R_s)_R - M/(R_m)_R = 2MP_R \qquad (4)$$

Therefore, overall astigmatism of the objective and relay lens system as a whole becomes as follows:

$$\frac{3}{(R_s)_O} + \frac{3M}{(R_s)_R} - \left(\frac{1}{(R_m)_O} + \frac{M}{(R_m)_R}\right) = 2P_O = 2MP_R \qquad (5)$$

From the above formulas (1) and (5), overall sagittal astigmatism of the objective and relay lens system as a whole becomes as follows:

$$\frac{3}{(R_s)_O} + \frac{3M}{(R_s)_R} = 2P_O = 2MP_R \qquad (6)$$

Therefore, in order to arrange so that sagittal astigmatism of the objective offsets sagittal astigmatism of the relay lens system as a whole when meridional astigmatism of the objective offsets meridional astigmatism of the relay lens system as a whole, the relation between Petzval's sum of the objective and Petzval's sum of the relay lens system as a whole should become as follows:

$$P_O = -MP_R \qquad (7)$$

That is, to favourably offset astigmatism of the relay lens system as a whole by astigmatism of the objective, the formulas (1) and (7) have to be satisfied at the same time. However, it is considerably difficult to satisfactorily offset both of meridional astigmatism and sagittal astigmatism at the same time, i.e., to satisfy both of the formulas (1) and (7) at the same time. This is due to the fact that the field angle of the objective is large, i.e., 60° to 80° while the field angle of the relay lens group is about 6°. That is, even when it is so arranged that the absolute value of Petzval's sum of the objective calculated for paraxial rays become equal to the absolute value of Petzval's sum of the relay lens system as a whole calculated for paraxial rays and that signs (+, −) of those values become different from each other, difference of focusing positions in the portion of large field angle becomes large because of astigmatism of higher order due to the fact that the field angle of the objective is large. Moreover for an endoscope, it is necessary to make its outer diameter as small as possible. Therefore, the front diverging lens group of the objective should have simple lens configuration and, consequently, the number of negative lenses constituting the front diverging lens group is limited. To arrange so that Petzval's sum of the objective becomes a positive value, it is therefore preferable to make the focal length $f_1$ of the front diverging lens group small. However, to minimize astigmatism of higher order, it is preferable to make $f_1$ large. As for the outer diameter, it is advantageous for making the outer diameter of the front diverging lens group small when $f_1$ is small. However, to make the outer diameter of the rear converging lens group small, it is advantageous when $f_1$ is large. Because of the above-mentioned restrictions, it is preferable to select $R_O/MP_R$ within the range defined by the condition (1). When it becomes $P_O/MP_R < -0.7$ in the condition (1), it is possible to make astigmatism approach Petzval surface. In that case, however, it is necessary to make $f_1$ small. When $f_1$ becomes small, the outer diameter of the rear converging lens group necessarily becomes large, spherical aberration of negative value with large absolute value occurs and astigmatism of higher order is caused. Moreover, as $f_1$ is contained also in the condition (2) which relates to coma, coma will be aggravated when $f_1$ becomes small.

If it becomes $P_O/MP_R < -0.35$ in the condition (1), sagittal astigmatism cannot be corrected satisfactorily though it may be possible to make meridional astigmatism close to zero.

Now, the conditions (2) and (3) are established for the purpose of attaining favourable symmetry of coma by favourably correcting meridional astigmatism by means of the formula (1) at the same time. Out of them, the condition (2) is most effective for correcting offaxial spherical aberration of lower rays. That is, the correcting effect for offaxial spherical aberration attained by the condition (2) differs in the order of lower rays, principal rays and upper rays. On the contrary, the correcting effect for offaxial spherical aberration attained by the condition (3) differs in the order of upper rays, principal rays and lower rays. That is, the largest correcting effect is attained for offaxial spherical aberration of upper rays. If, in the conditions (2) and (3), $f_1/f_O$ or $|r_a/f_O|$ becomes larger than the upper limit, favourable symmetry of coma cannot be attained though astigmatism can be corrected favourably. That is, when $f_1/f_O$ becomes larger than the upper limit of the condition (2), offaxial spherical aberration of lower rays will be overcorrected and that of upper rays will be undercorrected. On the other hand, when $|r_a/f_O|$ becomes larger than the upper limit of the condition (3), offaxial spherical aberration of lower rays will be undercorrected and that of upper rays will be overcorrected. If, in the conditions (2) and (3), $f_1/f_O$ or $|r_a/f_O|$ becomes smaller than the lower limit, meridional astigmatism will be undercorrected. That is, when one of $f_1/f_O$ and $|r_a/f_O|$ becomes smaller than the lower limit of the corresponding condition, it may be possible to favourably correct meridional astigmatism by increasing the other up to a value close to its upper limit. In that case, however, symmetry of coma becomes unfavourable due to the above-mentioned reason and the lens system will be unfit for use as an objective for endoscopes.

Besides, to correct particular aberrations more favourably without largely changing the basic lens configuration of the above-mentioned objective for endoscopes according to the present invention, the following alternatives are considered. One is to add a positive lens in front of the rear converging lens group of the aforementioned basic lens configuration as a member constituting the rear converging lens group. The arrangement is illustrated in FIG. 15. Thus, it is possible to correct spherical aberration more favourably. The other is to add a negative lens in rear of the rear converging lens group of the basic lens configuration as a member constituting the rear converging lens group. This arrangement is illustrated in FIG. 15. Thus, it is possible to correct lateral chromatic aberration more easily.

BRIEF DESCRIPTION OF THE DRAWINGS

FIGS. 7A, 7B, 7C, 7D, 8A, 8B, 8C, 8D, 9A, 9B, 9C and 9D respectively show graphs illustrating aberration curves of Embodiment 1;

FIGS. 10A, 10B, 10C and 10D respectively show graphs illustrating aberration curves of Embodiment 2;

FIGS. 11A, 11B, 11C and 11D respectively show graphs illustrating aberration curves of Embodiment 3;

FIGS. 12A, 12B, 12C and 12D respectively show graphs illustrating aberration curves of Embodiment 4;

FIGS. 13A, 13B, 13C and 13D respectively show graphs illustrating aberration curves of Embodiment 5; and FIGS. 14A, 14B, 14C and 14D respectively show graphs illustrating aberration curves of Embodiment 6.

DETAILED DESCRIPTION OF THE PREFERRED EMBODIMENTS

Figure 1:
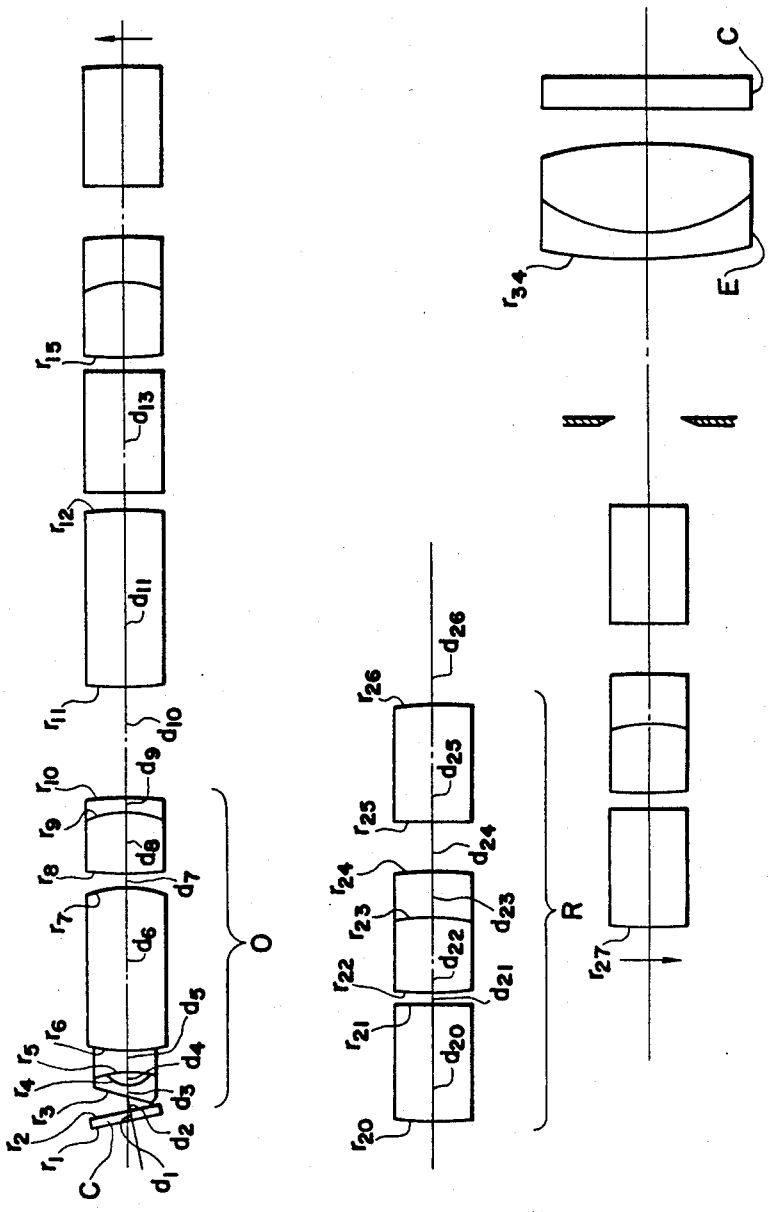
FIG. 1 through 6 respectively show sectional views of Embodiments 1 through 6 of the objective for endoscopes according to the present invetion.

Preferred embodiments of the objective for endoscopes according to the present invention explained in the above are as shown below:

Embodiment 1

$r_1 = \infty$
  $d_1 = 0.31$   $n_1 = 1.51633$   $\nu_1 = 64.15$
$r_2 = \infty$
  $d_2 = 0.55$
$r_3 = \infty$
  $d_3 = 0.44$   $n_2 = 1.78831$   $\nu_2 = 47.39$
$r_4 = 0.855$
  $d_4 = 0.4$
$r_5 = -8.242$
  $d_5 = 0.8$   $n_3 = 1.69100$   $\nu_3 = 54.71$
$r_6 = 3.001$
  $d_6 = 6.002$   $n_4 = 1.62588$   $\nu_4 = 35.70$
$r_7 = -3.001$
  $d_7 = 0.4$
$r_8 = 14.319$
  $d_8 = 2.0$   $n_5 = 1.62041$   $\nu_5 = 60.27$
$r_9 = -2.382$
  $d_9 = 0.5$ (ra)   $n_6 = 1.78472$   $\nu_6 = 25.71$
$r_{10} = 9.65$
  $d_{10} = 9.63$
$r_{11} = 7.3$
  $d_{11} = 6.0$   $n_7 = 1.51633$   $\nu_7 = 64.15$
$r_{12} = -7.3$
  $d_{12} = 0.56$
$r_{13} = \infty$
  $d_{13} = 23.9$   $n_8 = 1.62004$   $\nu_8 = 36.25$
$r_{14} = \infty$
  $d_{14} = 0.45$
$r_{15} = 15.741$
  $d_{15} = 2.5$   $n_9 = 1.65160$   $\nu_9 = 58.52$
$r_{16} = -3.347$
  $d_{16} = 1.5$   $n_{10} = 1.80801$   $\nu_{10} = 40.75$
$r_{17} = -7.404$
  $d_{17} = 1.75$
$r_{18} = \infty$
  $d_{18} = 24.9$   $n_{11} = 1.62004$   $\nu_{11} = 36.25$
$r_{19} = -11.03$
  $d_{19} = 4.0$
$r_{20} = 11.03$
  $d_{20} = 24.9$   $n_{12} = 1.62004$   $\nu_{12} = 36.25$
$r_{21} = \infty$
  $d_{21} = 0.45$
$r_{22} = 15.741$
  $d_{22} = 2.5$   $n_{13} = 1.65160$   $\nu_{13} = 58.52$
$r_{23} = -3.347$
  $d_{23} = 1.5$   $n_{14} = 1.80801$   $\nu_{14} = 40.75$
$r_{24} = -7.404$
  $d_{24} = 1.75$
$r_{25} = \infty$
  $d_{25} = 24.9$   $n_{15} = 1.62004$   $\nu_{15} = 36.25$
$r_{26} = -11.03$ $d_{26} = 4.0$ (The above $r_{20}$ through $r_{26}$, $d_{20}$ through $d_{26}$, $n_{12}$ through n and $\mu_{12}$ through $\nu_{15}$ relate to the relay lens groups and, therefore, are repeated by the number of relay lens groups constituting the endoscope).

$r_{27} = 11.03$
  $d_{27} = 24.9$   $n_{16} = 1.62004$   $\nu_{16} = 36.25$
$r_{28} = \infty$
  $d_{28} = 0.45$
$r_{29} = 15.741$
  $d_{29} = 2.5$   $n_{17} = 1.65160$   $\nu_{17} = 58.52$
$r_{30} = -3.347$
  $d_{30} = 1.5$   $n_{18} = 1.80801$   $\nu_{18} = 40.75$
$r_{31} = -7.404$
  $d_{31} = 1.75$
$r_{32} = \infty$
  $d_{32} = 23.9$   $n_{19} = 1.62004$   $\nu_{19} = 36.25$
$r_{33} = \infty$
  $d_{33} = 16.43$
$r_{34} = 17.956$
  $d_{34} = 1.0$   $n_{20} = 1.78472$   $\nu_{20} = 25.71$
$r_{35} = 6.345$
  $d_{35} = 3.3$   $n_{21} = 1.67003$   $\nu_{21} = 47.11$
$r_{36} = -15.967$
  $d_{36} = 1.0$
$r_{37} = \infty$
  $d_{37} = 1.0$   $n_{22} = 1.51633$   $\nu_{22} = 64.15$
$r_{38} = \infty$
Po = $-0.369$,  $P_R = 0.695$,  $f_1 = -1.085$,  fo = 2.197

Embodiment 2

$r_1 = \infty$
  $d_1 = 0.2$   $n_1 = 1.78831$   $\nu_1 = 47.39$
$r_2 = 0.816$
  $d_2 = 0.3$
$r_3 = \infty$
  $d_3 = 3.656$   $n_2 = 1.78831$   $\nu_2 = 47.39$
$r_4 = \infty$
  $d_4 = 1.33$   $n_3 = 1.80801$   $\nu_3 = 40.75$
$r_5 = -2.483$
  $d_5 = 0.3$
$r_6 = 10.903$
  $d_6 = 1.45$   $n_4 = 1.63854$   $\nu_4 = 55.42$
$r_7 = -1.608$
  $d_7 = 0.36$   $n_5 = 1.75574$   $\nu_5 = 25.71$
$r_8 = -7.136$
Po = $-0.294$,  $P_R = 0.695$,  $f_1 = -1.0363$,  fo = 1.556

Embodiment 3

$r_1 = \infty$
  $d_1 = 0.24$   $n_1 = 1.78831$   $\nu_1 = 47.39$
$r_2 = 0.846$
  $d_2 = 0.36$
$r_3 = \infty$
  $d_3 = 4.425$   $n_2 = 1.78831$   $\nu_2 = 47.39$
$r_4 = \infty$
  $d_4 = 1.6$   $n_3 = 1.80801$   $\nu_3 = 40.75$
$r_5 = -2.854$
  $d_5 = 0.36$
$r_6 = 13.199$
  $d_6 = 1.74$   $n_4 = 1.63854$   $\nu_4 = 55.42$
$r_7 = -1.999$
  $d_7 = 0.43$   $n_5 = 1.84666$   $\nu_5 = 23.83$
$r_8 = -9.403$
Po = $-0.318$,  $P_R = 0.805$,  $f_1 = -1.072$,  fo = 1.967

Embodiment 4

$r_1 = \infty$
  $d_1 = 0.3$   $n_1 = 1.78831$   $\nu_1 = 47.39$
$r_2 = 0.907$
  $d_2 = 0.9$
$r_3 = \infty$
  $d_3 = 3.59$   $n_2 = 1.78831$   $\nu_2 = 47.39$
$r_4 = \infty$
  $d_4 = 1.6$   $n_3 = 1.80801$   $\nu_3 = 40.75$
$r_5 = -2.849$
  $d_5 = 0.36$
$r_6 = 15.751$
  $d_6 = 1.74$   $n_4 = 1.63854$   $\nu_4 = 55.42$
$r_7 = -1.775$
  $d_7 = 0.43$   $n_5 = 1.78472$   $\nu_5 = 25.76$
$r_8 = -11.842$
Po = $-0.295$,  $P_R = 0.645$,  $f_1 = -1.1498$,  fo = 2.19

Embodiment 5

$r_1 = \infty$
  $d_1 = 1.1$   $n_1 = 1.78472$   $\nu_1 = 25.76$

-continued

| | | | |
|---|---|---|---|
| $r_2 = -8.203$ | | | |
| | $d_2 = 0.4$ | $n_2 = 1.69350$ | $\nu_2 = 53.33$ |
| $r_3 = 1.799$ | | | |
| | $d_3 = 1.1$ | | |
| $r_4 = \infty$ | | | |
| | $d_4 = 6.53$ | $n_3 = 1.78831$ | $\nu_3 = 47.39$ |
| $r_5 = \infty$ | | | |
| | $d_5 = 2.91$ | $n_4 = 1.80801$ | $\nu_4 = 40.75$ |
| $r_6 = -4.965$ | | | |
| | $d_6 = 0.66$ | | |
| $r_7 = 25.579$ | | | |
| | $d_7 = 3.17$ | $n_5 = 1.65844$ | $\nu_5 = 50.88$ |
| $r_8 = -2.978$ | | | |
| | $d_8 = 0.78$ | $n_6 = 1.80518$ | $\nu_6 = 25.43$ |
| $r_9 = -20.868$ | | | |
| $P_o = -0.112$, | $P_R = 0.213$, | $f_1 = -2.6791$, | $f_o = 4.392$ |
| Embodiment 6 | | | |
| $r_1 = \infty$ | | | |
| | $d_1 = 0.3$ | $n_1 = 1.78831$ | $\nu_1 = 47.39$ |
| $r_2 = 1.296$ | | | |
| | $d_2 = 0.3$ | | |
| $r_3 = \infty$ | | | |
| | $d_3 = 7.46$ | $n_2 = 1.78831$ | $\nu_2 = 47.39$ |
| $r_4 = \infty$ | | | |
| | $d_4 = 2.28$ | $n_3 = 1.78179$ | $\nu_3 = 37.09$ |
| $r_5 = -4.376$ | | | |
| | $d_5 = 1.5$ | | |
| $r_6 = 27.79$ | | | |
| | $d_6 = 2.48$ | $n_4 = 1.63854$ | $\nu_4 = 55.42$ |
| $r_7 = -2.754$ | | | |
| | $d_7 = 0.61$ | $n_5 = 1.78472$ | $\nu_5 = 25.76$ |
| $r_8 = -15.021$ | | | |
| $P_o = -0.215$, | $P_R = 0.404$, | $f_1 = -1.6435$, | $f_o = 3.482$ |

In the above embodiments, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respective represent Abbe's numbers of respective lenses.

Figure 2:
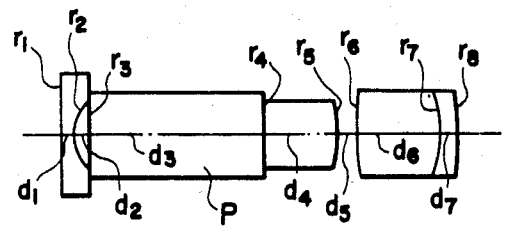
Figure 3:
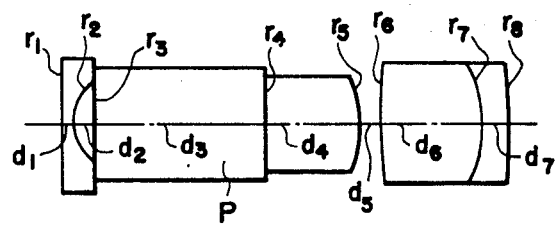
Figure 4:
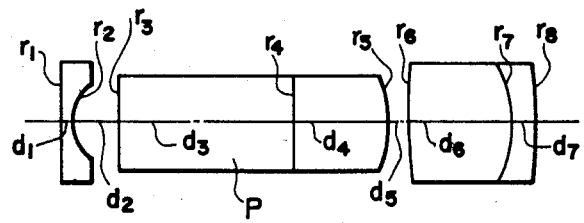
Figure 5:
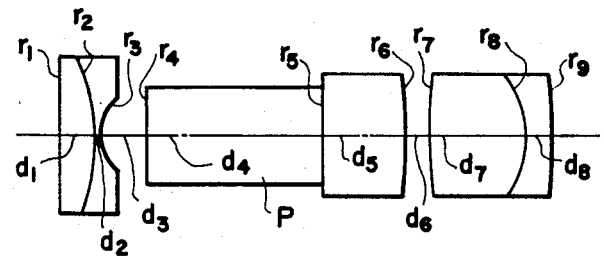
Figure 6:
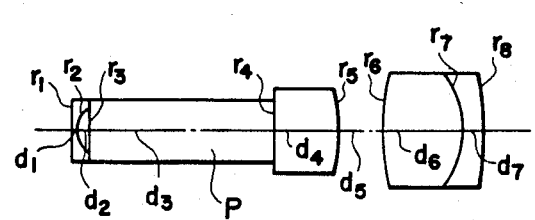
Figures 7A, 7B, 7C:
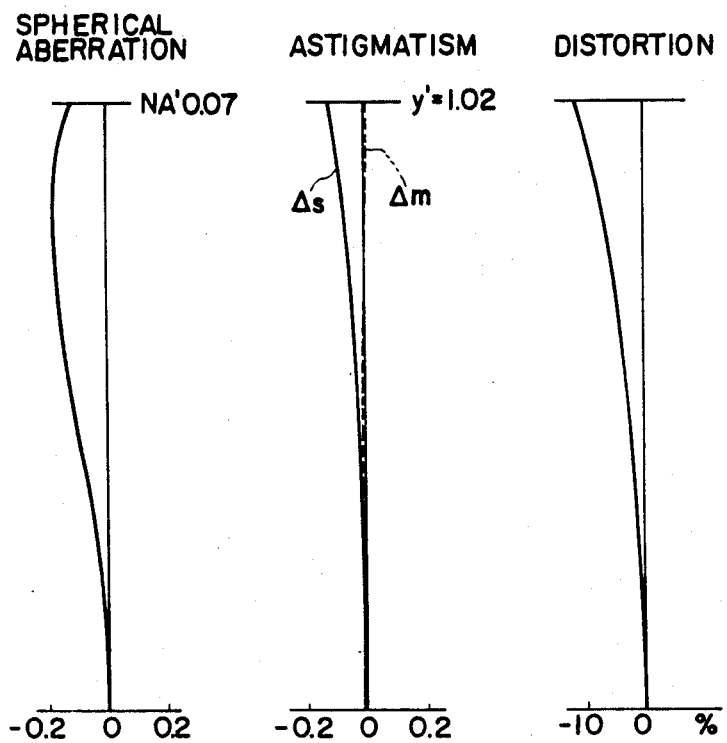
Figure 7D:
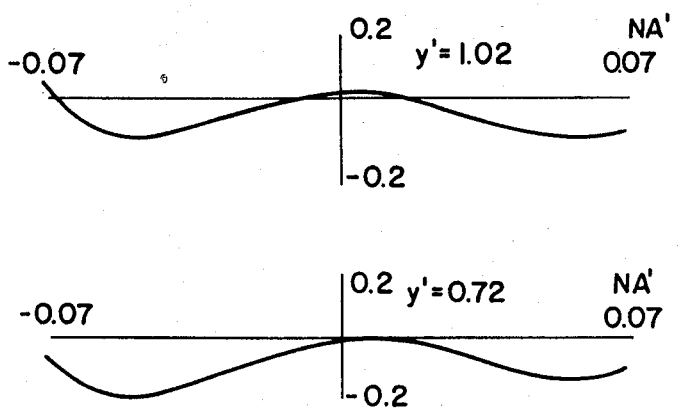
Figure 15:
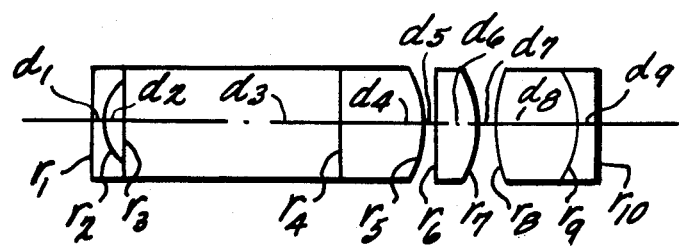
FIG. 15 is a sectional view of another embodiment of an objective for endoscopes which includes a positive lens in front of the rear converging lens group.
Figure 16:
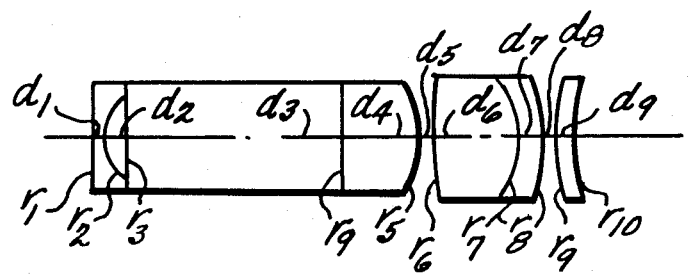
FIG. 16 is a sectional view of another embodiment of an objective for endoscopes which includes a negative lens on the image side of the rear converging lens group.

Out of the above embodiments, Embodiment 1 has lens configuration shown in FIG. 1, in which reference symbol C represents the cover glass, reference symbol O represents the objective, reference symbols $R_0$, R represent the relay lens groups, reference symbol F represents a field lens, and reference symbol E represents the eyepiece. In this embodiment, the objective O comprises the diverging lens group consisting of a negative lens and converging lens group consisting of two positive cemented doublets. In the embodiment shown in FIG. 1, the surface on the object side of the diverging lens group is inclined. This is for the purpose of using the objective for oblique viewing by refracting the light by the above surface and, therefore, the cover glass arranged in front of the diverging lens group is also inclined. Embodiment 2 has lens configuration shown in FIG. 2 which shows the objective only. The other arrangement is the same as that shown in FIG. 1. Embodiments 3 through 6 are respectively arranged as shown in FIGS. 3 through 6 which also show the objectives only because the other arrangement is substantially same as that shown in FIG. 1. In these embodiments, reference symbol P in figures represents prisms for changing the direction of light in order to use the objective for side viewing or oblique viewing though they are simply illustrated like glass blocks. In each of these figures, the prism is cemented to the positive lens arranged in rear of the prism. However, it is of course all right to arrange the prism and positive lens by leaving an airspace between them without cementing them together. For Embodiments 3 through 6, numerical values of relay lens groups (one group each for respective embodiments) are as shown below:

Embodiment 3

| | | | |
|---|---|---|---|
| $r_{20} = 9.492$ | | | |
| | $d_{20} = 19.78$ | $n_{12} = 1.62004$ | $\nu_{12} = 36.25$ |
| $r_{21} = \infty$ | | | |
| | $d_{21} = 2.5$ | | |
| $r_{22} = 6.133$ | | | |
| | $d_{22} = 1.61$ | $n_{13} = 1.80801$ | $\nu_{13} = 40.75$ |
| $r_{23} = 2.836$ | | | |
| | $d_{23} = 2.68$ | $n_{14} = 1.64050$ | $\nu_{14} = 60.10$ |
| $r_{24} = -14.138$ | | | |
| | $d_{24} = 0.9$ | | |
| $r_{25} = \infty$ | | | |
| | $d_{25} = 19.78$ | $n_{15} = 1.62004$ | $\nu_{15} = 36.25$ |
| $r_{26} = -9.492$ | | | |

Embodiment 4

| | | | |
|---|---|---|---|
| $r_{20} = 11.942$ | | | |
| | $d_{20} = 26.01$ | $n_{12} = 1.62004$ | $\nu_{12} = 36.25$ |
| $r_{21} = \infty$ | | | |
| | $d_{21} = 2.52$ | | |
| $r_{22} = 8.04$ | | | |
| | $d_{22} = 1.61$ | $n_{13} = 1.80801$ | $\nu_{13} = 40.75$ |
| $r_{23} = 3.6$ | | | |
| | $d_{23} = 2.68$ | $n_{14} = 1.65160$ | $\nu_{14} = 58.52$ |
| $r_{24} = -16.46$ | | | |
| | $d_{24} = 1.18$ | | |
| $r_{25} = \infty$ | | | |
| | $d_{25} = 26.01$ | $n_{15} = 1.62004$ | $\nu_{15} = 36.25$ |
| $r_{26} = -11.942$ | | | |

Embodiment 5

| | | | |
|---|---|---|---|
| $r_{20} = 21.431$ | | | |
| | $d_{20} = 50.31$ | $n_{12} = 1.62004$ | $\nu_{12} = 36.25$ |
| $r_{21} = \infty$ | | | |
| | $d_{21} = 2.58$ | | |
| $r_{22} = 15.72$ | | | |
| | $d_{22} = 1$ | $n_{13} = 1.80801$ | $\nu_{13} = 40.75$ |
| $r_{23} = 7.152$ | | | |
| | $d_{23} = 3$ | $n_{14} = 1.65160$ | $\nu_{14} = 58.52$ |
| $r_{24} = -28.266$ | | | |
| | $d_{24} = 1.8$ | | |
| $r_{25} = \infty$ | | | |
| | $d_{25} = 50.31$ | $n_{15} = 1.62004$ | $\nu_{15} = 36.25$ |
| $r_{26} = -21.431$ | | | |

Embodiment 6

| | | | |
|---|---|---|---|
| $r_{20} = 18.645$ | | | |
| | $d_{20} = 44.46$ | $n_{12} = 1.62004$ | $\nu_{12} = 36.25$ |
| $r_{21} = \infty$ | | | |
| | $d_{21} = 1.14$ | | |
| $r_{22} = 24.71$ | | | |
| | $d_{22} = 2.65$ | $n_{13} = 1.65160$ | $\nu_{13} = 58.52$ |
| $r_{23} = -6.259$ | | | |
| | $d_{23} = 0.88$ | $n_{14} = 1.80801$ | $\nu_{14} = 40.75$ |
| $r_{24} = -13.957$ | | | |
| | $d_{24} = 1.81$ | | |
| $r_{25} = \infty$ | | | |
| | $d_{25} = 44.46$ | $n_{15} = 1.62004$ | $\nu_{15} = 36.25$ |
| $r_{26} = -18.645$ | | | |

For Embodiment 1, reference symbols for the relay lens group were given, for example, as $r_{20}$ through $r_{26}$ for radii of curvature of respective lens surfaces. Therefore, in the above numerical data of relay lens groups for Embodiments 3 through 6, reference symbols are given in the same way as Embodiment 1.

Now, values of astigmatism etc., for respective embodiments are shown below:

(1) For relay lens groups:

| | Length of one relay lens group | Image height | Number of relay lens groups (M) | For one relay lens group $\Delta s$ | $\Delta m$ |
|---|---|---|---|---|---|
| Embodiment 1 | 59.995 | 1.025 | 5 | −0.093 | −0.131 |
| Embodiment 2 | 59.995 | 1.025 | 5 | −0.093 | −0.131 |
| Embodiment 3 | 51.253 | 1.3 | 5 | −0.172 | −0.243 |
| Embodiment 4 | 64.011 | 1.2998 | 5 | −0.138 | −0.196 |
| Embodiment 5 | 116.996 | 2.6499 | 3 | −0.344 | −0.53 |
| Embodiment 6 | 103.364 | 1.8002 | 5 | −0.183 | −0.286 |

| | $P_R$ | $\Delta s\, X_M$ | $\Delta m\, X_M$ | $P_R\, X_M$ |
|---|---|---|---|---|
| Embodiment 1 | 0.139 | −0.465 | −0.655 | 0.695 |
| Embodiment 2 | 0.139 | −0.465 | −0.655 | 0.695 |
| Embodiment 3 | 0.161 | −0.86 | −1.215 | 0.805 |
| Embodiment 4 | 0.129 | −0.69 | −0.98 | 0.645 |
| Embodiment 5 | 0.071 | −1.032 | −1.59 | 0.213 |
| Embodiment 6 | 0.0807 | −0.915 | −1.43 | 0.404 |

(2) For objective:

| | Field angle | Image height | $\Delta s$ | $\Delta m$ | $P_O$ |
|---|---|---|---|---|---|
| Embodiment 1 | 54°29′ | 1.025 | 0.327 | 0.565 | −0.369 |
| Embodiment 2 | 79°6′ | 1.025 | 0.277 | 0.535 | −0.294 |
| Embodiment 3 | 81°6′ | 1.3 | 0.553 | 1.156 | −0.318 |
| Embodiment 4 | 70°6′ | 1.3 | 0.45 | 0.868 | −0.295 |
| Embodiment 5 | 69°59′ | 2.63 | 0.693 | 1.308 | −0.112 |
| Embodiment 6 | 59°23′ | 1.8 | 0.698 | 1.447 | −0.215 |

(3) Values related to conditions (1), (2) and (3)

| | $P_O/MP_R$ | $r_a/f_o$ | $f_1/f_o$ |
|---|---|---|---|
| Embodiment 1 | −0.53 | −1.084 | −0.494 |
| Embodiment 2 | −0.42 | −1.033 | −0.666 |
| Embodiment 3 | −0.395 | −1.008 | −0.545 |
| Embodiment 4 | −0.46 | −0.811 | −0.525 |
| Embodiment 5 | −0.53 | −0.678 | −0.610 |
| Embodiment 6 | −0.53 | −0.791 | −0.472 |

In the above, reference symbol $\Delta s$ represents sagittal astigmatism when the image height is maximum and reference symbol $\Delta m$ represents meridional asitgmatism also when the image height is maximum. For the relay lens groups, these numerical values show those for one relay lens group. Besides, Petzval's sum $P=\Sigma_i(1/n_i f_i)$ is not normalized by the focal length.

Aberrations of the above-mentioned respective embodiments are shown in FIGS. 7A, 7B, 7C and 7D through FIGS. 14A, 14B, 14C and 14D. Out of them, FIGS. 7A, 7B, 7C and 7D respectively show graphs illustrating aberration curves of the optical system as a whole of the endoscope according to Embodiment 1 but excluding the eyepiece. FIGS. 8A, 8B, 8C and 8D respectively show graphs illustrating aberration curves of the objective only of Embodiment 1 and FIGS. 9A, 9B, 9C and 9D respectively show graphs illustrating aberration curves of one relay lens group of Embodiment 1. As is evident from these figures, the objective according to the present invention has astigmatism of large positive value so that astigmatism of negative value caused by the relay lens system as a whole is offset by astigmatism of the objective and that aberrations of the optical system as a whole is favourably corrected as shown in FIGS. 7A, 7B, 7C and 7D. For Embodiments 2 through 6, aberration curves of objectives only are respectively shown in FIGS. 10A, 10B, 10C and 10D through FIGS. 14A, 14B, 14C and 14D. For these embodiments, it is evident from these figures that these objectives respectively have astigmatism of positive values in the same way as astigmatism of Embodiment 1 shown in FIG. 8B and, therefore, these objectives have the same effect as Embodiment 1.

As explained so far, the objective for endoscopes according to the present invention is a compact wide-angle lens system and is arranged so that it causes astigmatism of positive value. Therefore, astigmatism of negative value caused by the relay lens groups is offset by astigmatism of positive value caused by the objective and it is possible to observe the object by a favourable image.

We claim:

1. An objective for endoscopes to be used in such endoscope arranged to transmit an image of an object in turn by a plural number of relay lens groups and comprising a front diverging lens group having negative refractive power and a rear converging lens group comprising a positive lens and a positive cemented doublet having a cemented surface, said cemented surface having negative refractive power, said objective for endoscopes satisfying the following conditions:

(1) $-0.7 \leq P_O/MP_R \leq -0.35$
(2) $-0.75 \leq f_1/f_O \leq -0.4$
(3) $0.6 \leq |r_a/f_O| \leq 1.2$ wherein reference symbol $P_O$ represents Petzval's sum of the objective, reference symbol $P_R$ represents Petzval's sum of one relay lens group, reference symbol M represents the number of relay lens groups, reference symbol $f_1$ represents the focal length of the front diverging lens group, reference symbol $f_O$ represents the focal length of the objective, and reference symbol $r_a$ represents the radius of curvature of the cemented surface of the cemented doublet in the rear converging lens group.

2. An objective for endoscopes according to claim 1, in which said rear converging lens group further comprises a positive lens arranged on the object side in said rear converging lens group.

3. An objective for endoscopes according to claim 1, in which said rear converging lens group further comprises a negative lens arranged on the image side in said rear converging lens group.

4. An objective for endoscopes according to claim 1, in which said front diverging lens group consists of a negative lens and said rear converging lens group consists of two positive cemented doublets, said objective for endoscopes having the following numerical data:

$r_1 = \infty$
$\quad d_1 = 0.31 \quad n_1 = 1.51633 \quad \nu_1 = 64.15$
$r_2 = \infty$
$\quad d_2 = 0.55$
$r_3 = \infty$
$\quad d_3 = 0.44 \quad n_2 = 1.78831 \quad \nu_2 = 47.39$
$r_4 = 0.855$
$\quad d_4 = 0.4$ -continued

| | | | |
|---|---|---|---|
| $r_5 = -8.242$ | | | |
| | $d_5 = 0.8$ | $n_3 = 1.69100$ | $\nu_3 = 54.71$ |
| $r_6 = 3.001$ | | | |
| | $d_6 = 6.002$ | $n_4 = 1.62588$ | $\nu_4 = 35.70$ |
| $r_7 = -3.001$ | | | |
| | $d_7 = 0.4$ | | |
| $r_8 = 14.319$ | | | |
| | $d_8 = 2.0$ | $n_5 = 1.62041$ | $\nu_5 = 60.27$ |
| $r_9 = -2.382$ | | | |
| | $d_9 = 0.5$ | $n_6 = 1.78472$ | $\nu_6 = 25.71$ |
| $r_{10} = -9.65$ | | | |
| $P_o = -0.369,$ | $P_R = 0.695,$ | $f_1 = -1.085,$ | $f_o = 2.197$ | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses (reference symbol $n_1$ represents the refractive index of the cover glass), and reference symbols $\nu_1$ through $\nu_6$ respectively represent Abbe's numbers of respective lenses (reference symbol $\nu_1$ represents Abbe's number of the cover glass).

5. An objective for endoscopes according to claim 1, in which said front diverging lens group consists of a negative lens and said rear converging lens group consists of a positive lens and a positive cemented doublet, said objective for endoscopes having the following numerical data:

| | | | |
|---|---|---|---|
| $r_1 = \infty$ | | | |
| | $d_1 = 0.2$ | $n_1 = 1.78831$ | $\nu_1 = 47.39$ |
| $r_2 = 0.816$ | | | |
| | $d_2 = 0.3$ | | |
| $r_3 = \infty$ | | | |
| | $d_3 = 3.656$ | $n_2 = 1.78831$ | $\nu_2 = 47.39$ |
| $r_4 = \infty$ | | | |
| | $d_4 = 1.33$ | $n_3 = 1.80801$ | $\nu_3 = 40.75$ |
| $r_5 = -2.483$ | | | |
| | $d_5 = 0.3$ | | |
| $r_6 = 10.903$ | | | |
| | $d_6 = 1.45$ | $n_4 = 1.63854$ | $\nu_4 = 55.42$ |
| $r_7 = -1.608$ | | | |
| | $d_7 = 0.36$ | $n_5 = 1.75574$ | $\nu_5 = 25.71$ |
| $r_8 = -7.136$ | | | |
| $P_o = -0.294,$ | $P_R = 0.695,$ | $f_1 = -1.0363,$ | $f_o = 1.556$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_5$ respectively represent refractive indices of respective lenses (reference symbol $n_2$ represents the refractive index of the prism), reference symbols $\nu_1$ through $\nu_5$ respectively represent Abbe's numbers of respective lenses (reference symbol $\nu_2$ represents Abbe's number of the prism), reference symbol $P_O$ represents Petzval's sum of the objective, reference symbol $f_1$ represents the focal length of the front diverging lens group, and reference symbol $f_O$ represents the focal length of the objective.

6. An objective for endoscopes according to claim 1, in which said front diverging lens group consists of a negative lens and said rear converging lens group consists of a positive lens and a positive cemented doublet, said objective for endoscopes having the following numerical data:

| | | | |
|---|---|---|---|
| $r_1 = \infty$ | | | |
| | $d_1 = 0.24$ | $n_1 = 1.78831$ | $\nu_1 = 47.39$ |
| $r_2 = 0.846$ | | | |
| | $d_2 = 0.36$ | | |
| $r_3 = \infty$ | | | |
| | $d_3 = 4.425$ | $n_2 = 1.78831$ | $\nu_2 = 47.39$ |
| $r_4 = \infty$ | | | |
| | $d_4 = 1.6$ | $n_3 = 1.80801$ | $\nu_3 = 40.75$ |
| $r_5 = -2.854$ | | | |
| | $d_5 = 0.36$ | | |
| $r_6 = 13.199$ | | | |
| | $d_6 = 1.74$ | $n_4 = 1.63854$ | $\nu_4 = 55.42$ |
| $r_7 = -1.999$ | | | |
| | $d_7 = 0.43$ | $n_5 = 1.84666$ | $\nu_5 = 23.83$ |
| $r_8 = -9.403$ | | | |
| $P_o = -0.318,$ | $P_R = 0.805,$ | $f_1 = -1.072,$ | $f_o = 1.967$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_5$ respectively represent refractive indices of respective lenses (reference symbol $n_2$ represents the refractive index of the prism), reference symbols $\nu_1$ through $\nu_5$ respectively represent Abbe's numbers of respective lenses (reference symbol $\nu_2$ represents Abbe's number of the prism), reference symbol $P_O$ represents Petzval's sum of the objective, reference symbol $f_1$ represents the focal length of the front diverging lens group, and reference symbol $f_O$ represents the focal length of the objective.

7. An objective for endoscopes according to claim 1, in which said front diverging lens group consists of a negative lens and said rear converging lens group consists of a positive lens and a positive cemented doublet, said objective for endoscopes having the following numerical data:

| | | | |
|---|---|---|---|
| $r_1 = \infty$ | | | |
| | $d_1 = 0.3$ | $n_1 = 1.78831$ | $\nu_1 = 47.39$ |
| $r_2 = 0.907$ | | | |
| | $d_2 = 0.9$ | | |
| $r_3 = \infty$ | | | |
| | $d_3 = 3.59$ | $n_2 = 1.78831$ | $\nu_2 = 47.39$ |
| $r_4 = \infty$ | | | |
| | $d_4 = 1.6$ | $n_3 = 1.80801$ | $\nu_3 = 40.75$ |
| $r_5 = -2.849$ | | | |
| | $d_5 = 0.36$ | | |
| $r_6 = 15.751$ | | | |
| | $d_6 = 1.74$ | $n_4 = 1.63854$ | $\nu_4 = 55.42$ |
| $r_7 = -1.775$ | | | |
| | $d_7 = 0.43$ | $n_5 = 1.78472$ | $\nu_5 = 25.76$ |
| $r_8 = -11.842$ | | | |
| $P_o = -0.295,$ | $P_R = 0.645,$ | $f_1 = -1.1498,$ | $f_o = 2.19$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_5$ represent refractive indices of respective lenses (reference symbol $n_2$ represents the refractive index of the prism), reference symbols $\nu_1$ through $\nu_5$ respectively represent Abbe's numbers of respective lenses (reference symbol $\nu_2$ represents Abbe's number of the prism), reference symbol $P_O$ represents Petzval's sum of the objective, reference symbol $f_1$ represents the focal length of the front diverging lens group, and reference symbol $f_O$ represents the focal length of the objective.

8. An objective for endoscopes according to claim 1, in which said front diverging lens group consists of a negative cemented doublet and said rear converging lens group consists of a positive lens and a positive cemented doublet, said objective for endoscopes having the following numerical data:

| | | | |
|---|---|---|---|
| $r_1 = \infty$ | | | |
| | $d_1 = 1.1$ | $n_1 = 1.78472$ | $\nu_1 = 25.76$ |
| $r_2 = -8.203$ | | | |
| | $d_2 = 0.4$ | $n_2 = 1.69350$ | $\nu_2 = 53.33$ |
| $r_3 = 1.799$ | | | |
| | $d_3 = 1.1$ | | |
| $r_4 = \infty$ | | | |
| | $d_4 = 6.53$ | $n_3 = 1.78831$ | $\nu_3 = 47.39$ |
| $r_5 = \infty$ | | | |
| | $d_5 = 2.91$ | $n_4 = 1.80801$ | $\nu_4 = 40.75$ |
| $r_6 = -4.965$ | | | |
| | $d_6 = 0.66$ | | |
| $r_7 = 25.579$ | | | |
| | $d_7 = 3.17$ | $n_5 = 1.65844$ | $\nu_5 = 50.88$ |
| $r_8 = -2.978$ | | | |
| | $d_8 = 0.78$ | $n_6 = 1.80518$ | $\nu_6 = 25.43$ |
| $r_9 = -20.868$ | | | |
| $P_o = -0.112,$ | $P_R = 0.213,$ | $f_1 = -2.6791,$ | $f_o = 4.392$ | wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_6$ respectively represent refractive indices of respective lenses (reference symbol $n_3$ represents the refractive index of the prism), reference symbols $\nu_1$ through $\nu_6$ respectively represent Abbe's numbers of respective lenses (reference symbol $\nu_3$ represents Abbe's number of the prism), reference symbol $P_O$ represents Petzval's sum of the objective, reference symbol $f_1$ represents the focal length of the front diverging lens group, and reference symbol $f_O$ represents the focal length of the objective.

9. An objective for endoscopes according to claim 1, in which said front diverging lens group consists of a negative lens and said rear converging lens group consists of a positive lens and a positive cemented doublet, said objective for endoscopes having the following numerical data:

| | | | |
|---|---|---|---|
| $r_1 = \infty$ | | | |
| | $d_1 = 0.3$ | $n_1 = 1.78831$ | $\nu_1 = 47.39$ |
| $r_2 = 1.296$ | | | |
| | $d_2 = 0.3$ | | |
| $r_3 = \infty$ | | | |
| | $d_3 = 7.46$ | $n_2 = 1.78831$ | $\nu_2 = 47.39$ |
| $r_4 = \infty$ | | | |
| | $d_4 = 2.28$ | $n_3 = 1.78179$ | $\nu_3 = 37.09$ |
| $r_5 = -4.376$ | | | |
| | $d_5 = 1.5$ | | |
| $r_6 = 27.79$ | | | |
| | $d_6 = 2.48$ | $n_4 = 1.63854$ | $\nu_4 = 55.42$ |
| $r_7 = -2.754$ | | | |
| | $d_7 = 0.61$ | $n_5 = 1.78472$ | $\nu_5 = 25.76$ |
| $r_8 = -15.021$ | | | |
| $P_o = -0.215,$ | $P_R = 0.404,$ | $f_1 = -1.6435,$ | $f_o = 3.482$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_5$ respectively represent refractive indices of respective lenses (reference symbol $n_2$ represents the refractive index of the prism), reference symbols $\nu_1$ through $\nu_5$ respectively represent Abbe's numbers of respective lenses (reference symbol $\nu_2$ represents Abbe's number of the prism), reference symbol $P_O$ represents Petzval's sum of the objective, reference symbol $f_1$ represents the focal length of the front diverging lens group, and reference symbol $f_O$ represents the focal length of the objective.

* * * * *